UNITED STATES PATENT OFFICE.

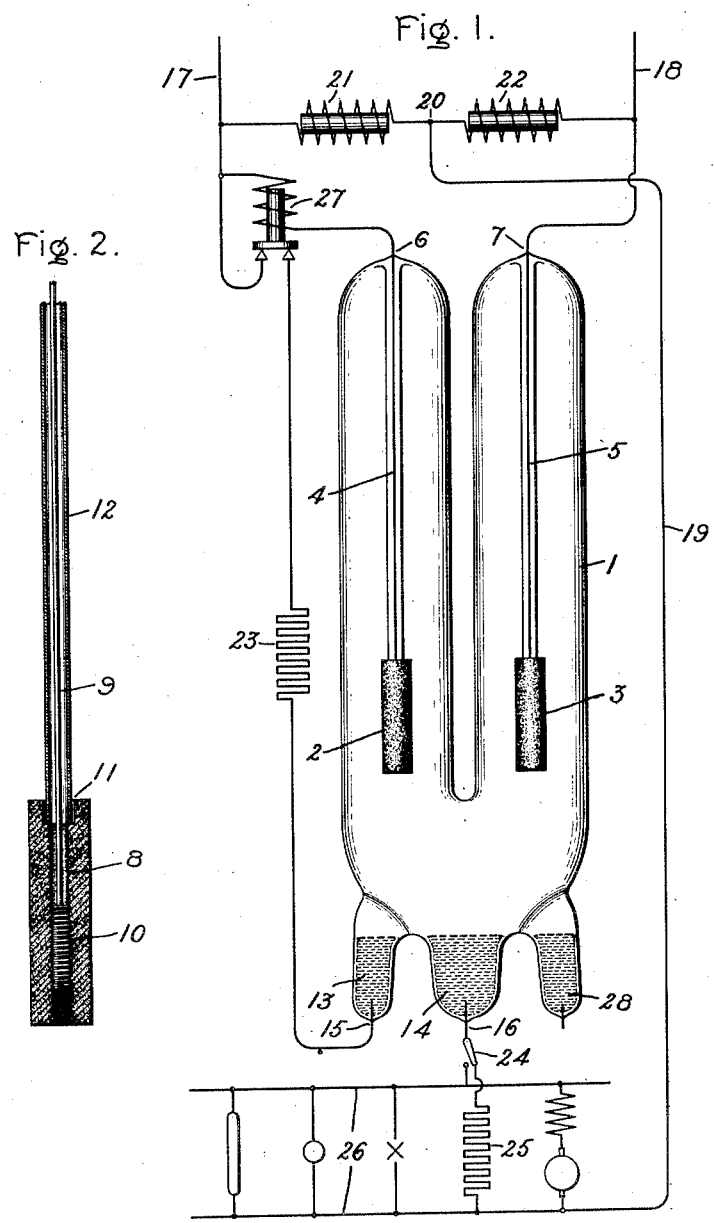

ALEXANDER McL. JACKSON, OF SCHENECTADY, NEW YORK, ASSIGNOR TO GENERAL ELECTRIC COMPANY, A CORPORATION OF NEW YORK.

VAPOR ELECTRIC APPARATUS.

1,081,308.    Specification of Letters Patent.    Patented Dec. 16, 1913.

Application filed January 9, 1904. Serial No. 188,339.

*To all whom it may concern:*

Be it known that I, ALEXANDER McL. JACKSON, a subject of the King of Great Britain, residing at Schenectady, county of Schenectady, State of New York, have invented certain new and useful Improvements in Vapor Electric Apparatus, of which the following is a specification.

My present invention relates to certain improvements in vapor electric apparatus and more especially to that type of apparatus adapted to the utilization of alternating current.

Certain of the features of my invention I find of particular utility in connection with mercury vapor rectifiers for alternating current and for this reason I have chosen a rectifier as a convenient means for illustrating my invention.

The features of novelty characteristic of the invention are pointed out with particularity in the appended claims. The invention itself, however, will be better understood by reference to the following description taken in connection with the accompanying drawings, in which, Figure 1 represents my invention as embodied in a rectifier for single phase alternating currents; Fig. 2 is a detail.

In Fig. 1 the rectifier proper consists of a highly exhausted U shaped envelop 1 of glass or other suitable material provided with electrodes. The anodes or positive electrodes 2 and 3 of the rectifier are located respectively in the sides or branches of the U and in positions somewhat above the bend connecting the sides. These anodes are of artificial graphite, carbon or other suitable material and are held in place by glass-inclosed wires 4, 5 the upper ends of which are welded or otherwise secured to platinum leading-in conductors 6, 7 passing through the walls of the upper ends of the envelop. The construction of the anodes is represented in sectional view and on a relatively enlarged scale in Fig. 2. From this figure it will be seen that each anode is bored axially as at 8. The supporting wire or conductor 9 of iron or other suitable material passes into this opening and carries at its lower end a threaded enlargement 10 which screws into threads formed in the opening 8. This enlargement 10 may for convenience be electrically welded to the supporting wire or rod 9 though it is obvious that any other convenient mode of construction may be employed. The upper portion of the opening or hole 8 is counterbored at 11 so as to receive the lower end of a glass tube 12 which surrounds the wire or conductor 9. The upper end of this tube is sealed to the wall of the envelop 1 as indicated in Fig. 1 and, by reason of its insertion in the counterbore 11, completely covers up and protects the conductor 9 by means of which current is conveyed to the electrode. This construction has the advantage of preventing the arc which goes to the electrode from extending up over the upper end of the same to the supply conductor 9. The remaining electrodes of the rectifier consist of bodies of mercury 13, 14 contained in downwardly extending depressions or pockets formed in the bottom of the envelop 1. Leading-in conductors as 15 and 16 serve to convey current between the electrodes and the external circuits of the rectifier.

In connecting up the rectifier the anodes 2 and 3 are connected to the alternating current supply mains 17 and 18. The large mercury electrode 14, which operates as a cathode, is connected through the current consuming circuit to a lead 19 the uper end of which is joined to the junction 20 between two inductance coils 21 and 22 in series between the supply mains 17 and 18. The small mercury electrode 13 is connected through a current limiting resistance 23 to one of the supply mains as for example the main 17. In starting up the rectifier the cathode 14 may be connected by a switch 24 to a starting resistance 25 instead of directly to the consumption circuit 26 though, if desired, this resistance may be omitted and the rectifier started directly on the consumption circuit. The use of the resistance, however, renders the starting somewhat easier. In order to start, the rectifier is shaken or tilted so as to cause mercury to flow over the dividing walls between the electrodes 13 and 14. When connection is thus formed between the electrodes current flows from the main 17 through the electrode 13 to the cathode 14 thence through either the resistance 25 or the consumption circuit 26, as the case may be, to the junction 20 and thence through the reactance coil 22 to the main 18. As soon as the momentary connection between the electrode is broken the current thus flowing creates an arc between electrodes 13 and 14 and thus generates ionized vapor. This arc continues until the current reverses in direction. If the original direction of the current happened to be such that the electrode 14 was a cathode or negative electrode then upon this reversal of current taking place the conducting path afforded by the generation of ionized vapor permits an arc to start from the anode 3 to the cathode. This arc is supplied partly by the discharge of energy then taking place from inductance coil 22 and partly by the direct flow of current from the main 18. As the current again reverses a similar arc takes place from the coöperating anode 2. The transfer of the arc from the anode 13 to the anode 2 in this manner is assisted greatly by the presence of the resistance 23 which renders the flow of current to the anode 13 more difficult, so to speak, than to the anode 2. After the rectifier is finally started there is a continuous unidirectional though pulsating flow of current from each anode to the cathode 14. The pulsations, however, overlap so that the current flowing to the consumption circuit is a nearly steady direct current. Inasmuch as the rectifier in its broader aspect is not of my invention no further description of its mode of operation seems necessary.

In a rectifier of the type mentioned considerable difficulty has heretofore arisen due to the tendency of arcing or spitting discharges to take place between the anodes when the rectifier is worked at other than low voltages. Heretofore, rectifiers operating on the principle of that described, have had their anodes mounted in the same chamber. In accordance with my invention the anodes, by being mounted respectively in the branches of a U tube, are separated from each other by the barrier constituted by the intervening walls of the tube and by reason of this particular arrangement are far less subject to the difficulties due to arcing.

It is obvious that many modifications of, as well as additions to, the organization which I have above described may be made without departing from my invention. Thus, for example, an automatic cut-out having its energizing winding 27 in circuit with the anode 2 may be used to interrupt the circuit of the anode 13 after the rectifier is started. Instead of being located in the lead extending to the anode 2, the energizing coil 27 may be in series with the cathode 16. Then again a pocket 28 may be provided as a supplemental reservoir of mercury. The mercury in this reservoir may, if desired, be used as a starting anode by connecting to the main 18 as in the case of the anode 13 and may be used in conjunction with the latter anode or, if desired, to the exclusion thereof.

What I claim as new and desire to secure by Letters Patent of the United States, is,

1. The combination of a container, a non-vaporizable electrode therefor, a conductor sealed into said container and mechanically supporting said electrode, and an insulating member surrounding said conductor spaced therefrom, and mechanically engaging with one end of the electrode.

2. The combination of an electrode, an insulating tube having one end sunk in the electrode, and a wire or conductor extending loosely through the tube and making electrical connection with the electrode.

3. The combination of a source of single phase alternating current, a highly exhausted U shaped envelop provided with solid electrodes, connections between said electrodes and said source, and energy storing means associated with said electrodes and said source so as to prevent an interruption in the current flow in said envelop.

4. The combination of an exhausted envelop consisting of tubular members communicating with each other, solid electrodes located respectively in said tubular members, a vaporizable electrode located in that part of the envelop connecting said members, and a circuit extending from the vaporizable electrode through energy storing means to an alternating current supply source.

5. The combination of an exhausted envelop comprising tubular upright chambers and a chamber communicating with said upright chambers, electrodes extending downward near the junction points of said chambers and a mercury electrode situated in the communicating chamber.

6. The combination of an exhausted U-shaped container of substantially uniform diameter, a mercury electrode in said chamber situated in the bent portion, solid electrodes situated in the upright portions of said chamber, conductors supporting said electrodes and conducting current thereto, and insulation surrounding said conductors.

7. The combination of an exhausted container comprising upright tubular chambers, a chamber communicating therewith, a mercury electrode in said chamber, electrodes in said tubular chambers near their open ends, leading-in wires for each of said electrodes sealed into said chambers near their closed ends and extending through said chambers.

In witness whereof I have hereunto set my hand this 8th day of January, 1904.

ALEXANDER McL. JACKSON.

Witnesses:
BENJAMIN B. HULL,
HELEN ORFORD.